(12) United States Patent
Zhao

(10) Patent No.: US 10,009,731 B2
(45) Date of Patent: Jun. 26, 2018

(54) INFORMATION SHARING METHOD, DEVICE AND STORAGE MEDIUM

(71) Applicant: Tencent Technology (Shenzhen) Company Limited, Shenzhen (CN)

(72) Inventor: Jie Zhao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days. days.

(21) Appl. No.: 15/197,231

(22) Filed: Jun. 29, 2016

(65) Prior Publication Data

US 2016/0316340 A1 Oct. 27, 2016

Related U.S. Application Data

(63) Continuation of application No. PCT/CN2015/088811, filed on Sep. 2, 2015.

(30) Foreign Application Priority Data

Sep. 2, 2014 (CN) .......................... 2014 1 0442430

(51) Int. Cl.
*H04W 4/02* (2018.01)
*H04L 29/08* (2006.01)
(Continued)

(52) U.S. Cl.
CPC ............ *H04W 4/028* (2013.01); *H04L 67/18* (2013.01); *H04L 67/26* (2013.01); *H04W 4/003* (2013.01); *H04W 88/02* (2013.01)

(58) Field of Classification Search
CPC ......... H04L 67/18; H04L 67/06; H04L 67/26; G06F 17/30091; G06F 17/3012;
(Continued)

(56) References Cited

U.S. PATENT DOCUMENTS 8,484,092 B1 * 7/2013 Strand .................. G06Q 30/02
705/26.1
2012/0297466 A1 * 11/2012 Li .......................... G06F 21/10
726/7
(Continued)

FOREIGN PATENT DOCUMENTS

CN 102056079 A 5/2011
CN 102750292 A 10/2012
(Continued)

OTHER PUBLICATIONS

Office Action dated Feb. 4, 2017 for Chinese Application No. 201410442430.9, 9 pages.
(Continued)

*Primary Examiner* — Thai Vu
(74) *Attorney, Agent, or Firm* — Brinks Gilson & Lione

(57) ABSTRACT

An information sharing method, device and storage medium are provided. The method comprises: receiving from a first terminal device, a first message requesting information-for-sharing; determining a current location of the first terminal device based on a location from which the first message is transmitted, and recording the current location as a first geographical location; determining that a geographical sharing range matched with the first geographical location exists in pre-set geographical sharing ranges; determining information-for-sharing corresponding to the geographical sharing range matched with the first geographical location as target information-for-sharing, based on a correspondence between the geographical sharing range and information-for-sharing uploaded in the geographical sharing range; and transmitting the target information-for-sharing to the first terminal device.

14 Claims, 15 Drawing Sheets

(51) Int. Cl.
*H04W 4/00* (2018.01)
*H04W 88/02* (2009.01)

(58) Field of Classification Search
CPC ............... G06Q 50/01; H04N 1/00159; H04N 2201/3253; H04W 4/003; H04W 4/021; H04W 4/023; H04W 4/028; H04W 88/02
See application file for complete search history.

(56) References Cited

U.S. PATENT DOCUMENTS

2014/0095607 A1* 4/2014 Fraccaroli .............. G06Q 50/01
709/204
2014/0351336 A1* 11/2014 Yeo ........................ G06Q 30/02
709/204
2015/0011175 A1* 1/2015 Mondal ................... H04W 4/02
455/404.2

FOREIGN PATENT DOCUMENTS

| CN | 102884816 A | 1/2013 |
|---|---|---|
| CN | 102930456 A | 2/2013 |
| CN | 102984219 A | 3/2013 |
| CN | 103347046 A | 10/2013 |
| CN | 103442046 A | 12/2013 |
| CN | 103841190 A | 6/2014 |
| CN | 104202396 A | 12/2014 |

OTHER PUBLICATIONS

International Search Report for PCT/CN2015/088811 dated Dec. 2, 2015.

* cited by examiner

INFORMATION SHARING METHOD, DEVICE AND STORAGE MEDIUM

CROSS REFERENCE TO RELATED APPLICATION

The present application is a continuation application of International Application No. PCT/CN2015/088811 filed on Sep. 2, 2015, which claims the priority to Chinese Patent Application No. 201410442430.9 filed on Sep. 2, 2014 with the State Intellectual Property Office of the People's Republic of China, both of which are incorporated herein by reference in their entirety.

TECHNICAL FIELD

The present disclosure relates to the technical field of information processing, and in particular to a method and a device for sharing information and a storage medium.

BACKGROUND

Information sharing refers to a process of sharing information among different users, i.e., after information to be shared is uploaded to a server by a user, other users (friends of the user who has uploaded the information, or strangers, which depends on a sharing setting of the user who has uploaded the information) may obtain the information from the server. The information to be shared may include images, texts, voices, etc.

In this scenario, when a user reaches a position, the user usually has a need of knowing information about places near the position. For example, when the user reaches a sight spot, the user usually has a need of knowing information about the sight spot (such as introductory information about the sight spot, or pictures of the sight spot taken by other tourists). In the scenario with such a need, a manner of information sharing includes: the inputting name of the current position via a terminal device, the terminal device of the user uploads a message for requesting information sharing which carries the name of current position to a server, the server obtaining shareable information, which correspond to the name of the position, from a database, and pushing the shareable information to the user device.

In such a manner of information sharing, if the user requests information corresponding to the current position while the user does not know the name of the current position, it will take the user some time to get to know the name of the current position. Therefore, the process of information sharing will be cumbersome.

SUMMARY

A method and device for sharing information and a storage medium are provided according to embodiments of the present disclosure, to solve a problem that the process of information sharing is cumbersome.

A method for sharing information is provided, which is executed in a server including n memory, one or mole processors and program instructions that are stored in the memory and are to be executed by the one or more processors. The method includes:

receiving, a first message for requesting information-for-sharing, the first message being transmitted by a first terminal device;

determining a current location of the first terminal device based on a location from which the first message is transmitted, and recording the current location as a first geographical location;

determining that a geographical sharing range matched with the first geographical location exists in pre-set geographical sharing ranges;

determining information-for-sharing corresponding to the geographical sharing range matched with the first geographical location as target information-for-sharing, based on a correspondence between the geographical sharing range and information-for-sharing uploaded in the geographical sharing range; and transmitting the target information-for-sharing to the first terminal device.

A device for sharing information is further provided according to an embodiment of the present disclosure, which operates in a server including a memory, one or more processors and one or more program modules stored in the memory and to be executed by the one or more processors. The one or more program modules include:

a first receiving module, configured to receive a first message for requesting information-for-sharing, the first message being transmitted by a first terminal device;

a first geographical location determining module, configured to determine a current location of the first terminal device based on a location from which the first message is transmitted, and record the current location as a first geographical location;

a determining module, configured to determine whether a geographical sharing range matched with the first geographical location exists in pre-set geographical sharing ranges;

a target information determining module configured to determine, information-for-sharing corresponding to the geographical sharing range matched with the first geographical location as target information-for-sharing, based on a correspondence between the geographical sharing range and information-for-sharing uploaded in the geographical sharing range, if it is determined that a geographical sharing range matched with the first geographical location exists; and a transmitting module, configured to transmit the target information-for-sharing to the first terminal device.

A storage medium for storing program instructions is further provided according to an embodiment of the present disclosure. The program instructions, when being executed by a processor, configure the processor to:

receive, a first message for requesting information-for-sharing, the first message being transmitted by a first terminal device;

determine a current location of the first terminal device based on a location from which the first message is transmitted, and record the current location as a first geographical location;

determine that a geographical sharing range matched with the first geographical location exists in pre-set geographical sharing ranges;

determine information-for-sharing matched with the first geographical location as target information-for-sharing, based on a correspondence between the geographical sharing range and information-for-sharing uploaded in the geographical sharing range; and transmit the target information-for-sharing to the first terminal device.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. The drawings described in the following only illustrate some embodiments of the present disclosure, and other drawings may be obtained by those skilled in the art based on these drawings without any creative efforts.

DETAILED DESCRIPTION OF THE EMBODIMENTS

In the embodiments, a first terminal device refers to a terminal device that requests information-for-sharing, a first geographical location refers to a geographical location where a first terminal device is located while requesting the information-for-sharing, a second terminal device refers to a terminal device that uploads the information-for-sharing, and a second geographical location refers to a geographical location where a second terminal device is located while uploading the information-for-sharing. The first terminal device and the second terminal device may exchange their roles. In other words, the first terminal device that requests the information-for-sharing may also be used as the second terminal device that uploads information-for-sharing. The first terminal device and the second terminal device may be the same terminal device.

The technical solutions in the embodiments of the present disclosure are clearly and completely described hereinafter in conjunction with the drawings. The described embodiments are only a few but not all of embodiments of the present disclosure. All other embodiments obtained by those skilled in the art based on the embodiments of the present disclosure without any creative efforts fall within the protection scope of the present disclosure.

Figure 1:
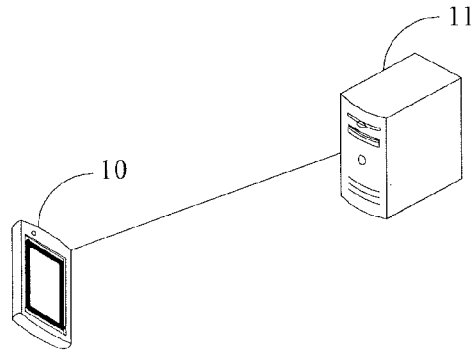
FIG. 1 is a structural block diagram of a system for sharing information according to an embodiment of the present disclosure.

FIG. 1 is a structural block diagram of a system for sharing information according to an embodiment of the present disclosure. The system includes: a first terminal device 10 and a server 11. The first terminal device 10 may be an intelligent terminal device such as a smart phone or a tablet computer. The server 11 may be a standalone server or a server group consisting of several servers.

Figure 2:
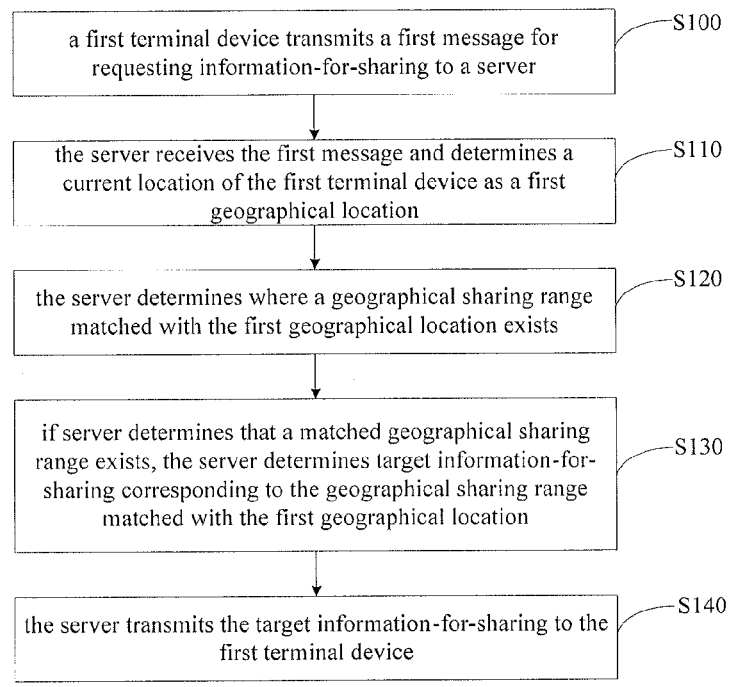
FIG. 2 is a flow of a method for sharing information according to an embodiment of the present disclosure.

FIG. 2 is a flow of a method for sharing information implemented by the system shown in FIG. 1. The method includes steps S100 to S140.

In step S100, a first terminal device transmits a first message for requesting information-for-sharing to a server.

In step S110, the server receives the first message and determines a current location of the first terminal device as a first geographical location.

In step S120, the server determines where a geographical sharing range matched with the first geographical location exists.

In step S130, if it is determined by the server that a geographical sharing range matched with the first geographical location exists, the server determines target information-for-sharing corresponding to the geographical sharing range matched with the first geographical location, based on a correspondence between the geographical sharing range and information-for-sharing uploaded in the geographical sharing range.

The geographical sharing range contains a second geographical location where a second terminal device is located while uploading the information-for-sharing.

The server may determines the correspondence between the geographical sharing range and the information-for-sharing, based on the information-for-sharing uploaded by the second terminal device and the second geographical location where the second terminal device is located while uploading the information-for-sharing.

In step S140, the server transmits the target information-for-sharing to the first terminal device.

If it is determined by the server that no geographical sharing range matched with the first geographical location exists, the server may determine that no information-for-sharing exists for places near the first geographical location, send prompt information indicating that there is no information-for-sharing to the first terminal device and end the process.

In the method, without the need of determining a name of a current position, information sharing may be realized based on a current location of a terminal device and the correspondence, pre-stored by the server, between the geographical sharing range and the information-for-sharing while the user does not know the name of the current position. Therefore, the process of information sharing is simplified, and sharing of the information related to the current location of the terminal device is realized conveniently. A method for sharing information according to an embodiment of the present disclosure is described hereinafter from the perspective of a server.

Figure 3:
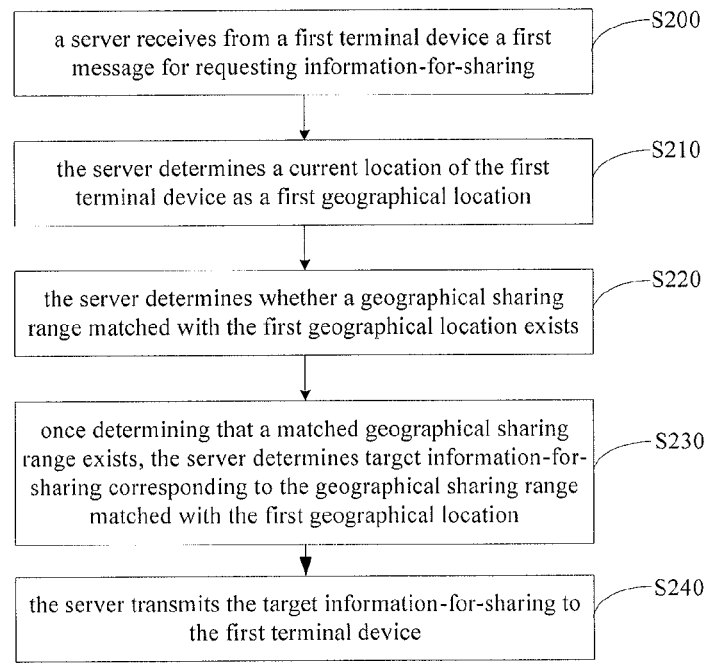
FIG. 3 is another flow chart of a method for sharing information according to an embodiment of the present disclosure.

FIG. 3 is another flow chart of a method for sharing information according to an embodiment of the present disclosure. The method includes steps S200 to S240.

In step S200, a server receives from a first terminal device a first message for requesting information-for-sharing.

In step S210, the server determines a current location of the first terminal device as a first geographical location.

The first message may carry first geographical location information, the first geographical location information may represent the first geographical location of the first terminal device. A possible implementation may include: the first terminal device determines the first geographical location via a geographical location positioning module such as a built-in GPS module or a satellite positioning module, and adds the first geographical location information to the first message. Thus, the server may determine the first geographical location of the first terminal device based on the first geographical location information in the first message. Alternatively, the first message does not carry the first geographical location information, and the server may request from a base station for the current location of the first terminal device by means of base station positioning and determine the current location as the first geographical location.

In step S220, the server determines whether a geographical sharing range matched with the first geographical location exists.

The geographical sharing range contains a second geographical location where a second terminal device is located while uploading information-for-sharing.

The geographical sharing range may be determined based on the second geographical location where the second terminal device is located while uploading the information-for-sharing. For example, a pre-determined range corresponding to the second geographical location is determined as the geographical sharing range corresponding to the information-for-sharing. The pre-determined range may be a range that centers at the second geographical location or a range that does not center at the second geographical location, which depends on specific application situations.

Alternatively, the geographical sharing range is a pre-determined geographical range. In a case that there is a second terminal device uploading the information-for-sharing in the pre-determined geographical range, the information-for-sharing uploaded by the second terminal device in the pre-determined geographical range is determined as information-for-sharing corresponding to the pre-determined geographical range. Or, after a geographical range is pre-determined as the geographical sharing range, information-for-sharing corresponding to the pre-determined geographical range is defined based on the information-for-sharing uploaded by the second terminal in the pre-determined geographical range.

The geographical sharing range matched with the first geographical location may refer to a geographical sharing range containing the first geographical location. The quantity of the geographical sharing range may be one or more, and may be pre-stored in the server.

In step S230, once determining that a geographical sharing range matched with the first geographical location exists, the server determines target information-for-sharing corresponding to the geographical sharing range matched with the first geographical location, based on a correspondence between the geographical sharing range and the information-for-sharing uploaded in the geographical sharing range.

A condition for implementing information sharing is that a geographical sharing range matched with the first geographical location exists, e.g., a user currently enters the geographical sharing range. The correspondence between the geographical sharing range and the information-for-sharing may be determined based on the information-for-sharing uploaded by the second terminal device and the second geographical location where the second terminal device is located while uploading the information-for-sharing. For example, after the geographical sharing range is determined based on the second geographical location where the second terminal device is located while uploading the information-for-sharing, the information-for-sharing uploaded by the second terminal device may be determined as information-for-sharing of the determined geographical sharing range. As another example, after a pre-determined geographical range is determined as the geographical sharing range, the information-for-sharing uploaded by the second terminal device in the geographical range may be determined as information-for-sharing of the geographical range. As a further example, after a pre-determined geographical range is determined as the geographical sharing range, information-for-sharing corresponding to the geographical range may be defined based on the information-for-sharing uploaded by the second terminal device in the geographical range.

In a case that there are multiple geographical sharing ranges, an overlap region may exist among the geographical sharing ranges. If the first geographical location is located in the overlap region, there may be multiple pieces of corresponding target information-for-sharing. In this case, the server is to push the multiple pieces of target information-for-sharing to the first terminal device.

In step S240, the server transmits the target information-for-sharing to the first terminal device.

In the method, the server may pre-store the correspondence between the geographical sharing range and the information-for-sharing.

If it is determined by the server that no geographical sharing range matched with the first geographical location exists, then the server may determine that no information-for-sharing exists for places near the first geographical location, transmit prompt information indicating that there is no information-for-sharing to the first terminal device and end the process. In other words, the user may obtain the information-for-sharing in the geographical sharing range only after the user enters the geographical sharing range.

Figure 4:
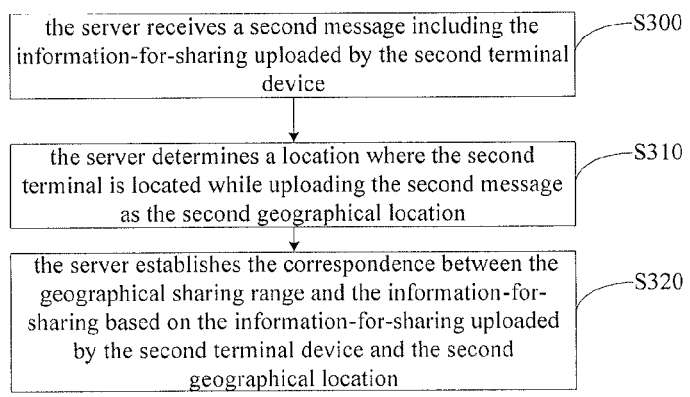
FIG. 4 is a flow of a method for determining a correspondence between a geographical sharing range and information-for-sharing according to an embodiment of the present disclosure.

As described above, the correspondence between the geographical sharing range and the information-for-sharing may be determined based on the information-for-sharing uploaded by the second terminal device and the second geographical location where the second terminal device is located while uploading the information-for-sharing. Accordingly, a method for determining the correspondence between the geographical sharing range and the information-for-sharing is shown in FIG. 4. The method includes steps S300 to S320.

In step S300, the server receives a second message including the information-for-sharing uploaded by the second terminal device.

In step S310, the server determines a location where the second terminal is located while uploading the second message as the second geographical location.

A principle for determining the second geographical location may be similar to that for determining the first geographical location in the step S210 described above.

In step S320, the server establishes the correspondence between the geographical sharing range and the information-for-sharing based on the information-for-sharing uploaded by the second terminal device and the second geographical location.

The Step S320 may be implemented in multiple manners, and three manners are listed hereinafter.

In a first implementation, the geographical sharing range is determined based on the second geographical location, and the correspondence between the geographical sharing range and the information-for-sharing is established. For example, a pre-determined range corresponding to the second geographical location is determined as the geographical sharing range, and the uploaded information-for-sharing is determined as the information-for-sharing corresponding to the geographical sharing range.

Figure 5:
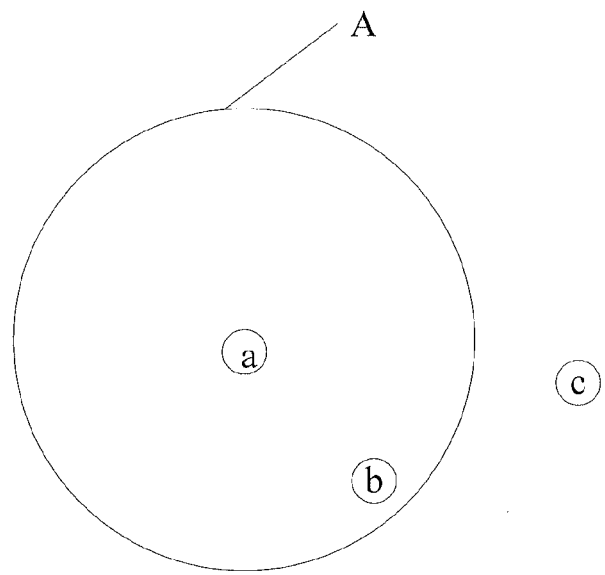
FIG. 5 is a schematic diagram of a geographical sharing range according to an embodiment of the present disclosure.

FIG. 5 is a schematic diagram of a geographical sharing range. As shown, circle a represents a second geographical location where a second terminal device is located while uploading information-for-sharing, a geographical range A is a corresponding geographical sharing range, circle b represents a first geographical location of a first terminal device, and circle c represents a first geographical location of another first terminal device. Since the first geographical location b is matched with the geographical sharing range A, the first terminal device corresponding to the first geographical location b can obtain information-for-sharing corresponding to the geographical sharing range A. The first geographical location c is not matched with the geographical sharing range A, thus the terminal device corresponding to the first geographical location c can not obtain the information-for-sharing corresponding to the geographical sharing range A.

Figure 6:
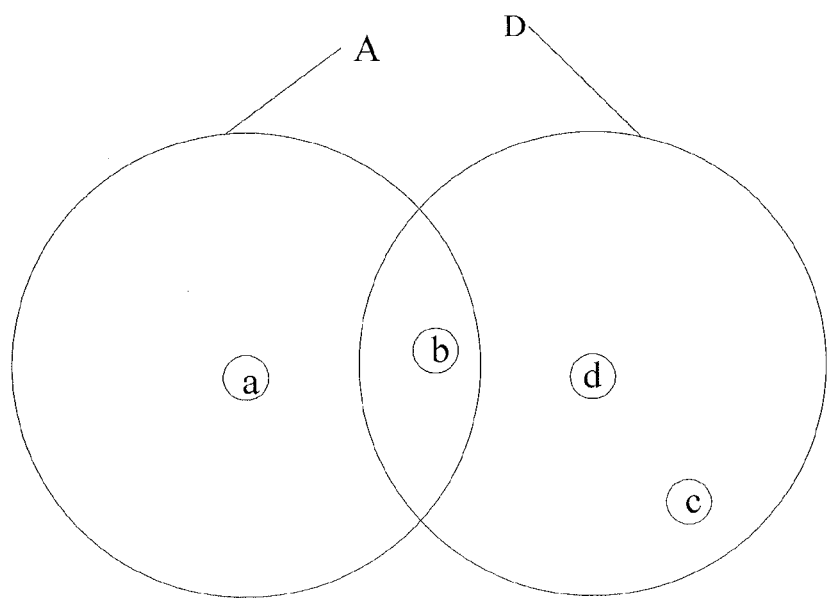
FIG. 6 is another schematic diagram of geographical sharing ranges according to an embodiment of the present disclosure.

There may be multiple geographical sharing ranges matched with the first geographical location. In other words, there is (are) overlap region(s) among the geographical sharing ranges. Accordingly, the first terminal device may obtain information-for-sharing corresponding to the multiple matched geographical sharing ranges. Accordingly, FIG. 6 shows a schematic diagram of corresponding geographical sharing ranges. In the figure, circle a is a second geographical location where a second terminal device is located while uploading information-for-sharing, and geographical range A is a corresponding geographical sharing range; circle d is a second geographical location where another second terminal device is located while uploading information-for-sharing, and geographical range D is a corresponding geographical sharing range; circle h is a first geographical location of a first terminal device, and circle c is a first geographical location of another first terminal device. The circle b is located in a region where the geographical range A overlaps the geographical range D, and the circle b is matched with both the geographical range A and the geographical range D. The circle c is located in a region of the geographical range D, and the c is matched with the geographical range D.

In a second implementation, a pre-determined geographical range is determined as the geographical sharing range. While the second terminal device is uploading the information-for-sharing in the pre-determined geographical range, the information-for-sharing uploaded by the second terminal device is determined as the information-for-sharing corresponding to the geographical sharing range. Alternatively, it may be determined whether the second terminal device has uploaded the information-for-sharing in the set geographical range by determining whether the pre-determined geographical range contains the second geographical location. That is, if the pre-determined geographical range contains the second geographical location, then it is determined that the second terminal device has uploaded the information-for-sharing in the pre-determined geographical range.

There may be multiple second terminal devices uploading information-for-sharing in the pre-determined geographical range.

In a third implementation, a pre-determined geographical range is determined as the geographical sharing range, and the information-for-sharing corresponding to the geographical sharing range is defined based on the information-for-sharing uploaded by the second terminal device in the pre-determined geographical range.

In practice, the step S320 may be implemented in multiple manners besides the three manners listed above. Those skilled in the art may determine the geographical sharing range and the corresponding information-for-sharing in accordance with actual application situations, based on the information-for-sharing uploaded by the second terminal device and the second geographical location.

Figure 7:
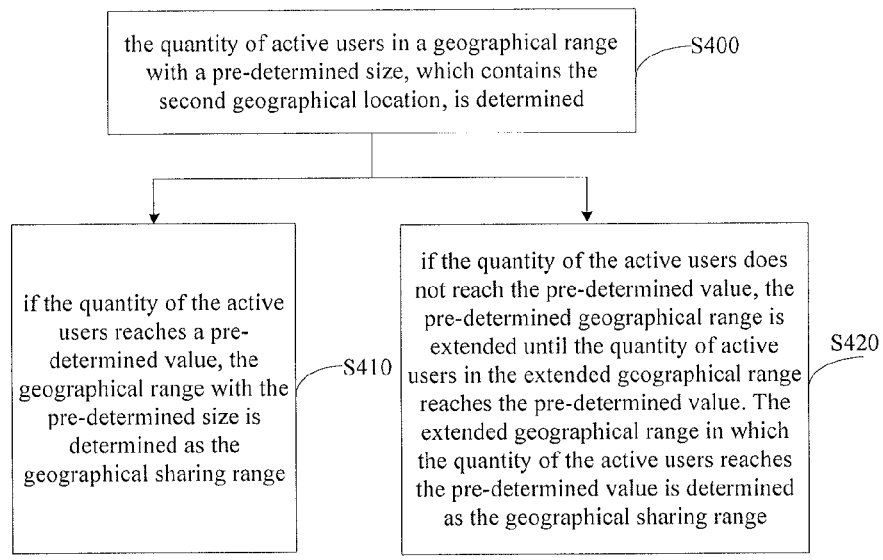
FIG. 7 is a flow chart of a method for determining a geographical sharing range according to an embodiment of the present disclosure.

A size of the geographical sharing range may be determined based on the quantity of active users. Accordingly, FIG. 7 is a flow of a method for determining the geographical sharing range of the information-for-sharing based on the second geographical location. The method may include steps S400 to S420.

In step S400, the quantity of active users in a geographical range with a pre-determined size, which contains the second geographical location, is determined.

In step S410, if the quantity of the active users reaches a pre-determined value, the geographical range with the pre-determined size is determined as the geographical sharing range.

In step S420, if the quantity of the active users does not reach the pre-determined value, the pre-determined geographical range is extended until the quantity of active users in the extended geographical range reaches the pre-determined value. The extended geographical range in which the quantity of the active users reaches the pre-determined value is determined as the geographical sharing range.

Figure 8:
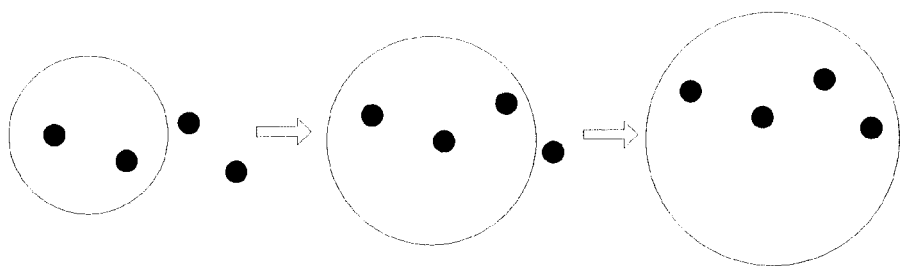
FIG. 8 is a schematic diagram of controlling a size of a geographical sharing range according to an embodiment of the present disclosure.

Accordingly, FIG. 8 is a schematic diagram of controlling a size of a geographical sharing range. Black circles in the figure represent active users, and a pre-determined value is 4.

The quantity of the active users may be determined by obtaining the quantity of different terminal devices uploading information-for-sharing in the geographical range within pre-determined time period.

Alternatively, the geographical sharing range is a range centered at the second geographical location.

Figure 9:
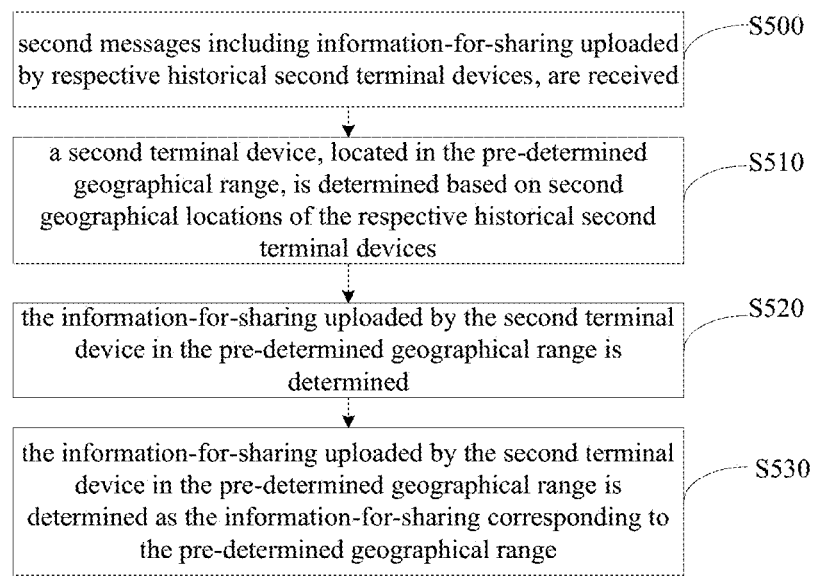
FIG. 9 is another flow chart of a method for determining a correspondence between a geographical sharing range and information-for-sharing according to an embodiment of the present disclosure.

For the second implementation described above, a flow of a method for determining the correspondence between the geographical sharing range and the information-for-sharing is shown in FIG. 9. The method includes steps S500 to S530.

In step S500, the server receives second messages including information-for-sharing uploaded by respective historical second terminal devices.

In step S510, the server determines a second terminal device located in the pre-determined geographical range based on second geographical locations of the respective historical second terminal devices.

In step S520, the server determines the information-for-sharing in the second message uploaded by the second terminal device in the pre-determined geographical range.

In step S530, the server determines the information-for-sharing in the second message uploaded by the second terminal device in the pre-determined geographical range as the information-for-sharing corresponding to the pre-determined geographical range.

Figure 10:
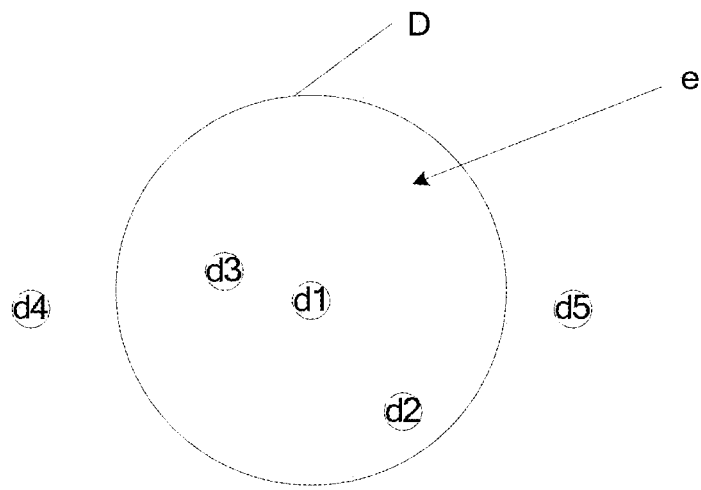
FIG. 10 is a schematic diagram of determining information-for-sharing corresponding to a given geographical range according to an embodiment of the present disclosure.

Corresponding to the method in FIG. 9, FIG. 10 is a schematic diagram of determining the information-for-sharing corresponding to the pre-determined geographical range. As shown, second terminal devices which upload information-for-sharing in a pre-determined geographical range D include a device d1, a device d2 and a device d3. Then the information-for-sharing uploaded by the device d1, the device d2 and the device d3 may be determined as information-for-sharing corresponding to the pre-determined geographical range D. Second terminal devices d4 and d5 do not upload information-for-sharing in the pre-determined geographical range D, thus the information-for-sharing uploaded by the device d4 and the device d5 are not determined as the information-for-sharing of the pre-determined geographical range D. When a first terminal device e moves into the pre-determined geographical range D, the pre-determined geographical range D becomes a geographical sharing range matched with a current first geographical location of the first terminal device e. In this case, the first terminal device e can obtain the information-for-sharing uploaded by the device d1, the device d2 and the device d3.

Figure 11:
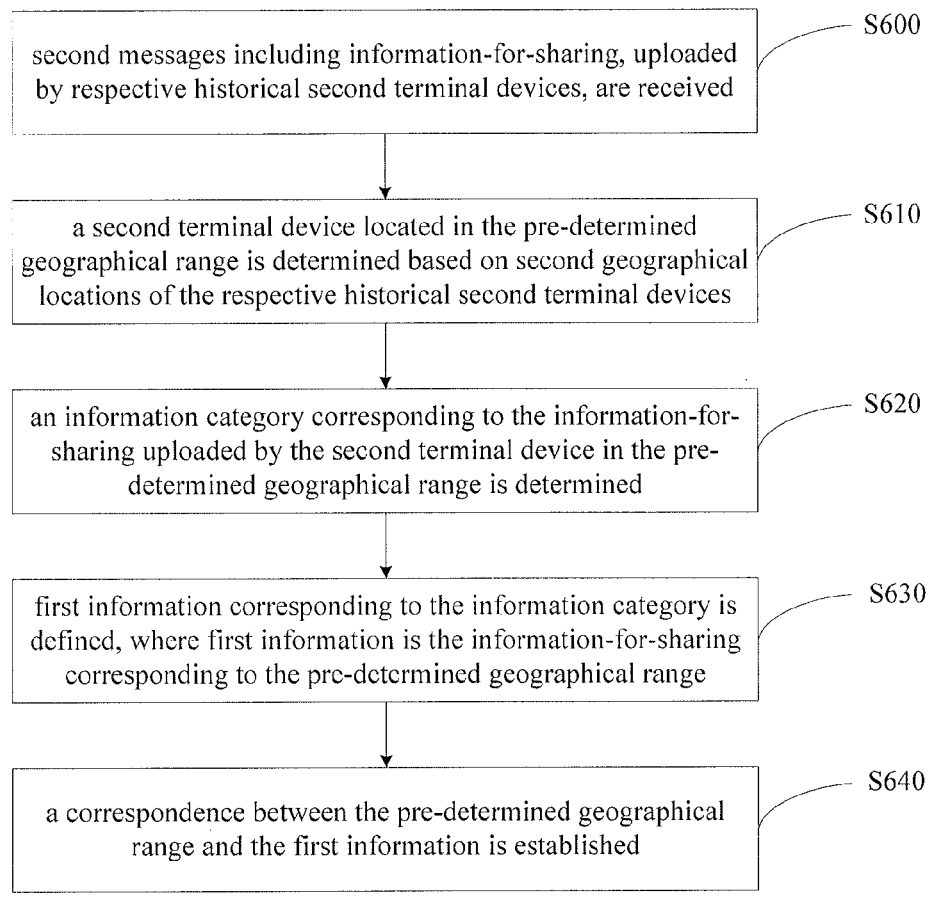
FIG. 11 is another flow chart of a method for determining a correspondence between a geographical sharing range and information-for-sharing according to an embodiment of the present disclosure.

For the third implementation described above, a flow of a method for determining the correspondence between the geographical sharing range and the information-for-sharing is shown in FIG. 11. The method includes steps S600 to S640.

In step S600, the server receives second messages including information-for-sharing, uploaded by respective historical second terminal devices.

In step S610, the server determines a second terminal device located in the pre-determined geographical range based on second geographical locations of the respective historical second terminal devices.

In step S620, the server determines an information category corresponding to the information-for-sharing in the second message uploaded by the second terminal device in the pre-determined geographical range.

In step S630, the server determines first information corresponding to the information category. The first information is the information-for-sharing corresponding to the pre-determined geographical range.

In step S640, the server establishes a correspondence between the pre-determined geographical range and the first information.

Since a user who has uploaded the information-for-sharing in the pre-determined geographical range is interested in the information category of the pushed first information, it has a high probability that the user that enters the pre-determined geographical range is interested in the first information pushed to the user. Therefore, precise pushing of information that the user is interested in is realized with a high probability.

By classifying information-for-sharing uploaded by each second terminal device in the pre-determined geographical range, a category which has the largest quantity of pieces of information-for-sharing is determined (or categories which are on the top in terms of the quantity of pieces of information-for-sharing are determined), and the category is the information category corresponding the pre-determined geographical range.

For purpose of determining of the information category, the second terminal device may add a description of the information-for-sharing while uploading the second message. For example, in a case that the information-for-sharing is a picture of lotuses, a descriptive term such as "lotus" may be added. In practice, the manner of adding the description of the information-for-sharing to the uploaded second message is also suitable for scenarios that are not to determine information category, such as scenarios in the first implementation and the second implementation described above.

In an application example, if the quantity of pieces of information describing fishing is largest among information-for-sharing uploaded by respective second terminal device in the pre-determined geographical range, it may be determined that an information category that users who upload the information-for-sharing in the pre-determined geographical range are interested in is related to fishing, and information about fishing (such as knowledge or news about fishing, or nearby fishing gear shops) may be determined as information-for-sharing in the pre-determined geographical range, thereby realizing pushing of the information-for-sharing about fishing to users who enter the pre-determined geographical range.

In addition, in the second implementation and the third implementation, a size of the pre-determined geographical range may be determined based on a pre-determined quantity of active users, i.e., by means of controlling the quantity of the active users in the pre-determined geographical range to reach a pre-determined value. In other words, for determining the geographical sharing range in the above embodiments, a size of the geographical sharing range may be determined based on the pre-determined quantity of the active users.

A right to select the target information-for-sharing from the correspondence between the geographical sharing range and the information-for-sharing may be set. For example, only information-for-sharing uploaded by a friend of a user that holds the first terminal device in the geographical sharing range matched with the first geographical location is determined as the target information-for-sharing. The right may be identified when the second terminal device uploads the information-for-sharing (such as carrying right setting information in the second message), i.e., when the second terminal device uploads the information-for-sharing, setting information indicating that the information-for-sharing is only open to the friends only or is open to everyone may be carried in the second message.

In order to facilitate selecting of the precise target information-for-sharing from the correspondence between the geographical sharing range and the information-for-sharing, electing information, such as electing keyword, may be added when the first terminal uploads the first message. When the server determines the target information-for-sharing based on the correspondence between the geographical sharing range and the information-for-sharing, the electing information is used for selecting information-for-sharing corresponding to the electing information and determining the information-for-sharing as the target information-for-sharing. That is, the server may determine the target information-for-sharing matching the electing information, from the information-for-sharing corresponding to the geographical sharing range matched with the first geographical location, based on the correspondence between the geographical sharing range and the information-for-sharing.

A case in which there are nine pieces of information-for-sharing corresponding to the geographical sharing range matched with the first geographical location and electing information is "lotus" is taken as an example. If six of the nine pieces of information-for-sharing are related to "lotus" (for example, each include a description of "lotus"), then it may be determined that the target information-for-sharing is the six pieces of information-for-sharing related to "lotus".

Figure 12:
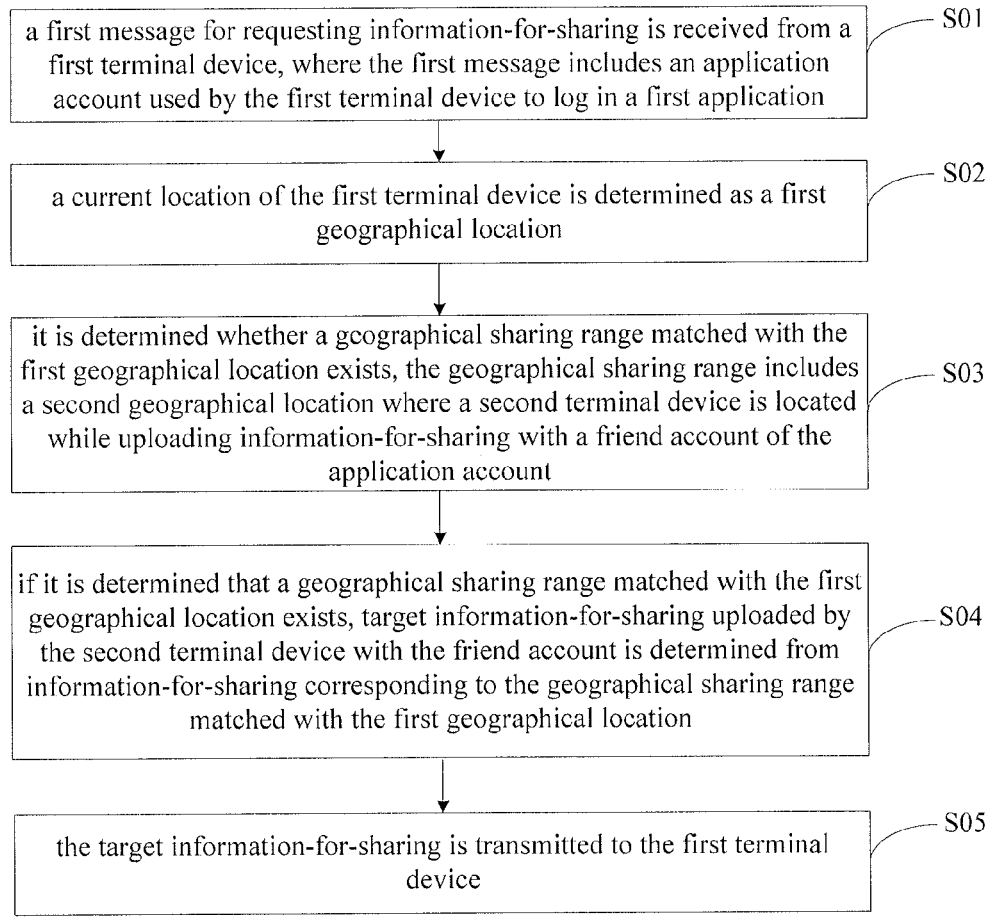
FIG. 12 is another flow chart of a method for sharing information according to an embodiment of the present disclosure.

The method for sharing information may be applied to a social application scenario, to realize viewing of information shared from a friend in the social application scenario. Accordingly, FIG. 12 shows another flow chart of a method for sharing information according to an embodiment of the present disclosure. The method includes step S01 to S05.

In step S01, a first message for requesting information-for-sharing, transmitted by a first terminal device, is received. The first message includes an application account used by the first terminal device to log in a first application.

The first application may be a social application, such as QQ or Wechat in China.

In step S02, a current location of the first terminal device is determined as a first geographical location.

Reference may be made to corresponding parts described above for a specific implementation of the step S02.

In step S03, it is determined whether a geographical sharing range matched with the first geographical location exists. The geographical sharing range includes a second geographical location where a second terminal device is located while uploading information-for-sharing with a friend account of the application account. Both the friend account and the application account are user accounts in the first application.

The geographical sharing range is a geographical range containing the second geographical location where the friend account of the application account is located while uploading the information-for-sharing. A current user may obtain target information-for-sharing only when located in the geographical sharing range corresponding to the second geographical location where a friend user is located while uploading the information-for-sharing.

In step S04, if it is determined that a geographical sharing range matched with the first geographical location exists, target information-for-sharing uploaded by the second terminal device with the friend account is determined from information-for-sharing corresponding to the geographical sharing range matched with the first geographical location.

If no geographical sharing range matched with the first geographical location exists, for example, the geographical sharing range does not contain the second geographical location where the second terminal device is located while uploading the information-for-sharing with the friend account of the application account, then the server may transmit a prompt to the first terminal indicating that there is no information-for-sharing and end the process.

It can be seen that, in the information-for-sharing corresponding to the geographical sharing range matched with the first geographical location, only the information-for-sharing uploaded with the friend account is the target information-for-sharing.

In step S05, the target information-for-sharing is transmitted to the first terminal device.

The entity that executes the method shown in FIG. 12 may be a server of the first application. Besides forwarding information among friend users, it may also realize obtaining of information-for-sharing for a user when the user reaches a location range where a friend of the user uploads information-for-sharing based on a geographical location where the friend is located while uploading the information-for-sharing. If the user does not reach the location range where the friend uploads the information-for-sharing, the user can not obtain the information-for-sharing uploaded by the friend at the location.

Alternatively, that entity that executes the method shown in FIG. 12 may be a standalone server capable of executing the method for sharing information, instead of the server of the first application. The standalone server may determine an application used by a user, based on an identifier of the first application carried by the first terminal device while uploading a user account, then performs date communication with an application server of the first application and determines a friend account of the user account in the first application, thereby realizing obtaining of information-for-sharing for the user when the user reaches a location range where a friend of the user uploads the information-for-sharing. If the user does not reach the location range where the friend uploads the information-for-sharing, the user can not obtain the information-for-sharing uploaded by the friend at the location.

Figure 13:
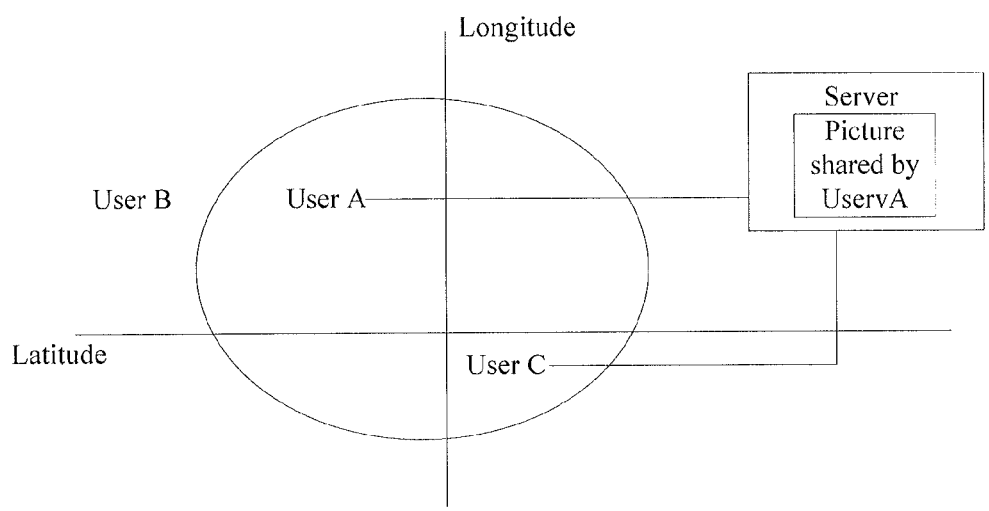
FIG. 13 is a schematic diagram of an application example according to an embodiment of the present disclosure.

As shown in FIG. 13, an application example of the method for sharing information in a social application scenario is provided hereinafter. Geographical locations are represented in the form of longitudes and latitudes. User A shares a picture with a social application at a location shown in the figure, and uploads the picture to a server. A circular region in FIG. 13 is a geographical sharing range of the picture shared by the user A. A friend user C of the user A in the social application, entering the circular region, may view the picture shared by the friend A on a device such as a mobile phone. A friend user B of the user A in the social application, not entering the circular region, can not view the picture shared by the friend A.

In the method, the process of information sharing is simplified, and sharing of information-for-sharing related to a current location of a terminal device is realized conveniently based on the current location of the terminal device.

Alternatively, a method for sharing information according to an embodiment of the present disclosure is described from the perspective of a terminal device. The method for sharing information described hereinafter and the method for sharing information described above from the perspective of the server may refer to each other.

Figure 14:
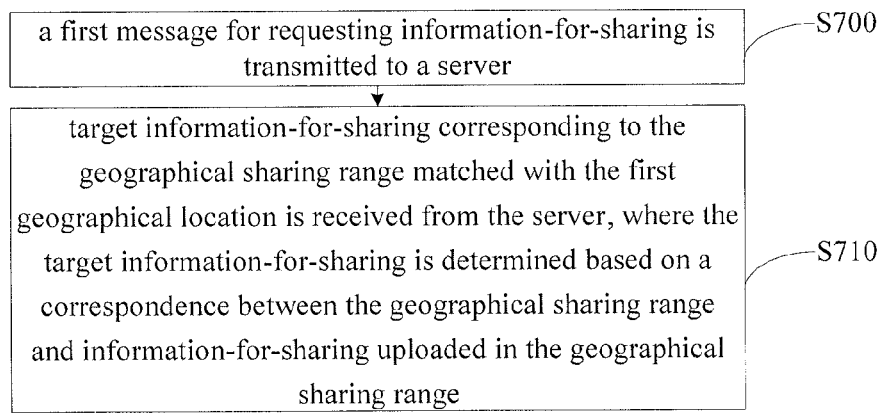
FIG. 14 is another flow chart of a method for sharing information according to an embodiment of the present disclosure.

FIG. 14 is another flow chart of a method for sharing information according to an embodiment of the present disclosure. The method includes steps S700 to S710.

In step S700, a first message for requesting information-for-sharing is transmitted to a server.

In step S710, after the server determines a current location of a terminal device as a first geographical location and determines that a geographical sharing range matched with the first geographical location exists, target information-for-sharing corresponding to the geographical sharing range matched with the first geographical location is received from the server, where the target information-for-sharing is determined based on a correspondence between the geographical sharing range and information-for-sharing uploaded in the geographical sharing range.

The geographical sharing range contains a second geographical location where a second terminal device is located while uploading the information-for-sharing.

The first message transmitted to the server by the terminal device may include first geographical location information representing the current first geographical location of the terminal device.

The first geographical location information may be provided for the server, so as to enable the server to determine the current first geographical location of the terminal device based on the first geographical location information. In this way, after the server determines the current first geographical location of the terminal device based on the first geographical location information carried in the first message and determines that a geographical sharing range matched with the first geographical location exists, the terminal device may receive the target information-for-sharing corresponding to the geographical sharing range matched with the first geographical location from the server, where the target information-for-sharing is determined based on the correspondence between the geographical sharing range and the information-for-sharing. The first message transmitted by the terminal device to the server may include electing information used for electing the target information-for-sharing.

The electing information may be provided for the server, so as to enable the server to determine the target information-for-sharing corresponding to the electing information, from the information-for-sharing corresponding to the geographical sharing range matched with the first geographical location. In this way, after the server determines the current first geographical location of the terminal device and determines that a geographical sharing range matched with the first geographical location exists, the terminal device may receive from the server the target information-for-sharing corresponding to the electing information, where the target information-for-sharing is determined from the information-for-sharing corresponding to the geographical sharing range matched with the first geographical location based on the correspondence between the geographical sharing range and the information-for-sharing.

The above descriptions are described from the perspective of the terminal device that requests information-for-sharing (i.e., the first terminal device). The device that requests information-for-sharing may also serve as a terminal device that uploads the information-for-sharing (i.e., the second terminal device). The method shown in FIG. 14 may further include the following step:

uploading a second message including the information-for-sharing to the server. After determining the second geographical location where the second terminal device is located while uploading the second message, the server may determine the geographical sharing range of the information-for-sharing based on the determined second geographical location, so that the server can establish the correspondence between the geographical sharing range and the information-for-sharing.

In a social application scenario, a manner of transmitting the first message for requesting information-for-sharing to the server in the method shown in FIG. 14 may include: transmitting the first message for requesting information-for-sharing to the server, where the first message includes an application account used by the first terminal to log in a first application.

A manner of receiving the target information corresponding to the geographical sharing range matched with the first geographical location, which is transmitted by the server and determined based on the correspondence between the geographical sharing range and the information-for-sharing, may include: receiving the determined target information-for-sharing transmitted by the server after the server determines that a geographical sharing range matched with the first geographical location exists and the target information-for-sharing uploaded by the second terminal device with a friend account is determined from the information-for-sharing corresponding to the geographical sharing range matched with the first geographical location, where the geographical sharing range contains the second geographical location where the second terminal device uploads the information-for-sharing with the friend account of the application account, and both the friend account and the application account are user accounts of the first application.

As shown in FIG. 13, since the friend user B of the user A in the social application requests information-for-sharing at the location shown in the figure, the friend user B can not view the picture shared by the friend A unless the user B enters the circular region (i.e., the geographical sharing range of the picture shared by the user A) shown in the figure. For example, when the user B reaches the location where the friend user C of the user A in the social application is located, the user B can view the picture shared by the friend A.

Figure 15:
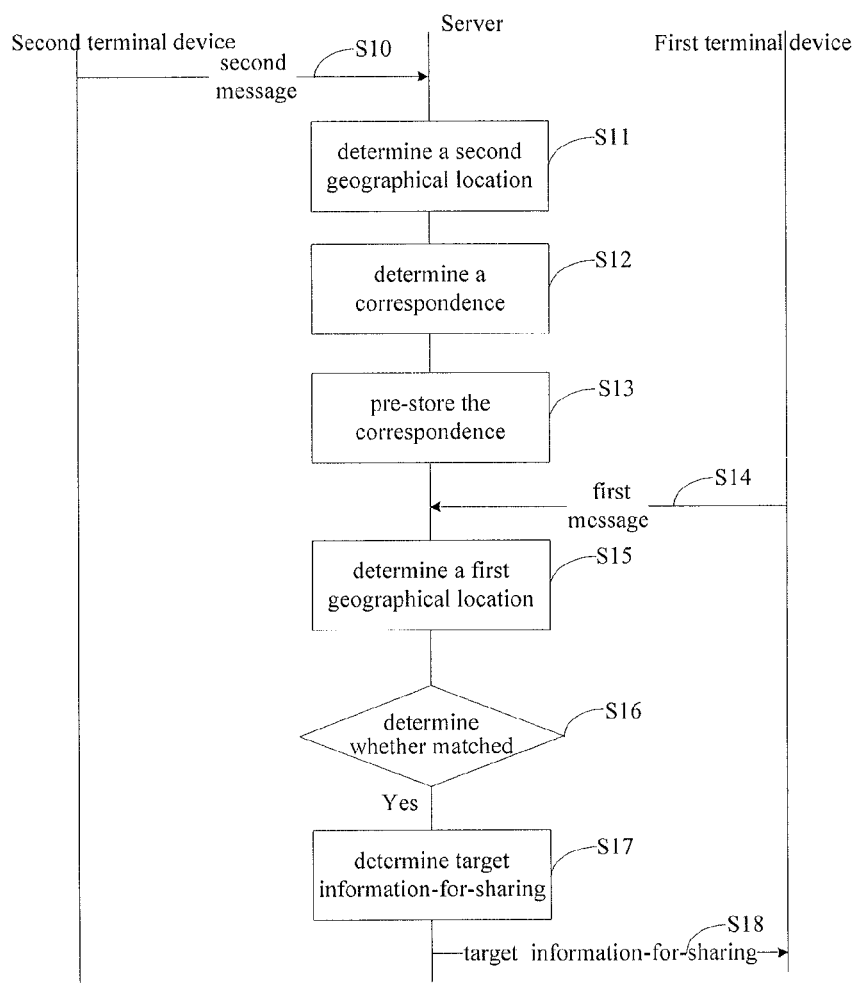
FIG. 15 is a signaling flow chart of a method for sharing information according to an embodiment of the present disclosure.

A method for sharing information according to an embodiment of the present disclosure is introduced below from the perspective of a first terminal device, a second terminal device and a server. FIG. 15 is a signaling flow chart of a method for sharing information according to an embodiment of the present disclosure. The method includes steps S10 to S18.

In step S10, a second terminal device uploads a second message including information-for-sharing to a server.

In step S11, the server determines a current second geographical location of the second terminal device.

In step S12, the server determines a correspondence between a geographical sharing range and the information-for-sharing based on the information-for-sharing uploaded by the second terminal device and the second geographical location. The geographical sharing range contains the second geographical location where the second terminal device uploads the information-for-sharing.

The manner of determining the correspondence may be the same as that in the first implementation, the second implementation and the third implementation described above, which is not repeated herein.

In step S13, the server pre-stores the correspondence between the geographical sharing range and the information-for-sharing.

In step S14, a first terminal device transmits a first message for requesting information-for-sharing to the server.

In step S15, the server determines a current first geographical location of the first terminal device.

In step S16, the server determines whether a geographical sharing range matched with the first geographical location exists.

In step S17, if it is determined by the server that a geographical sharing range matched with the first geographical location exists, the server determines target information-for-sharing corresponding to the geographical sharing range matched with the first geographical location, based on the correspondence between the geographical sharing range and the information-Cur-sharing uploaded in the geographical sharing range.

In step S18, the server transmits the target information-for-sharing to the first terminal device.

The first terminal device and the second terminal device may be the same terminal device.

Sharing of information may also be realized based on an augmented reality technology. The first terminal device may label objects in the real word at the first geographical location to generate a three-dimensional information space, and add the obtained target information-for-sharing to the three-dimensional information space.

A device for sharing information according to an embodiment of the present disclosure, which is described from the perspective of a server, is introduced hereinafter. For content described hereinafter which is related to a method for sharing information, reference may be made to the corresponding part described above.

Figure 16:
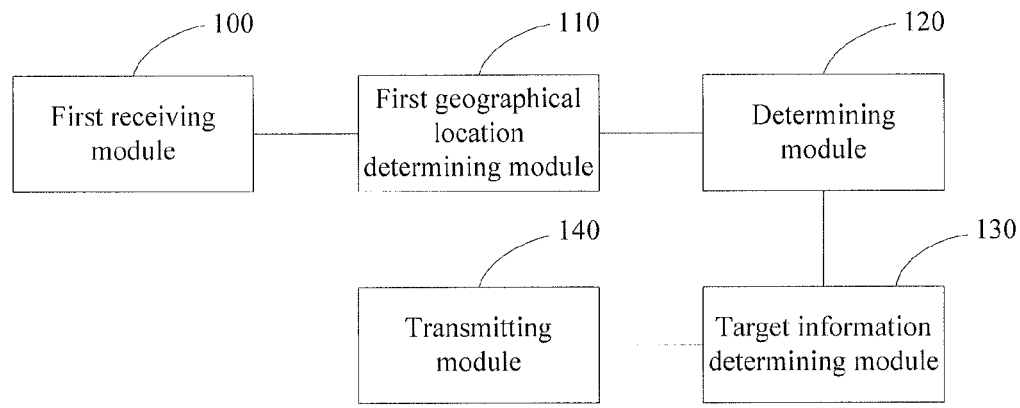
FIG. 16 is a structural block diagram of a device for sharing information according to an embodiment of the present disclosure.

FIG. 16 is a structural block diagram of a device for sharing information according to an embodiment of the present disclosure. The device for sharing information includes a first receiving module 100, a first geographical location determining module 110, a determining module 120, a target information determining module 130 and a transmitting module 140.

The first receiving module 100 is configured to receive from a first terminal device a first message for requesting information-for-sharing.

The first geographical location determining module 110 is configured to determine a current location of the first terminal device as a first geographical location.

The determining module 120 is configured to determine whether a geographical sharing range matched with the first geographical location exists. The geographical sharing range contains a second geographical location where a second terminal device is located while uploading information-for-sharing.

The target information determining module 130 is configured to determine, once it is determined by the determining module 120 that a geographical sharing range matched with the first geographical location exists, target information-for-sharing corresponding to the geographical sharing range matched with the first geographical location, based on a correspondence between the geographical sharing range and the information-for-sharing uploaded in the geographical sharing range.

The transmitting module 140 is configured to transmit the target information-for-sharing to the first terminal device.

Figure 17:
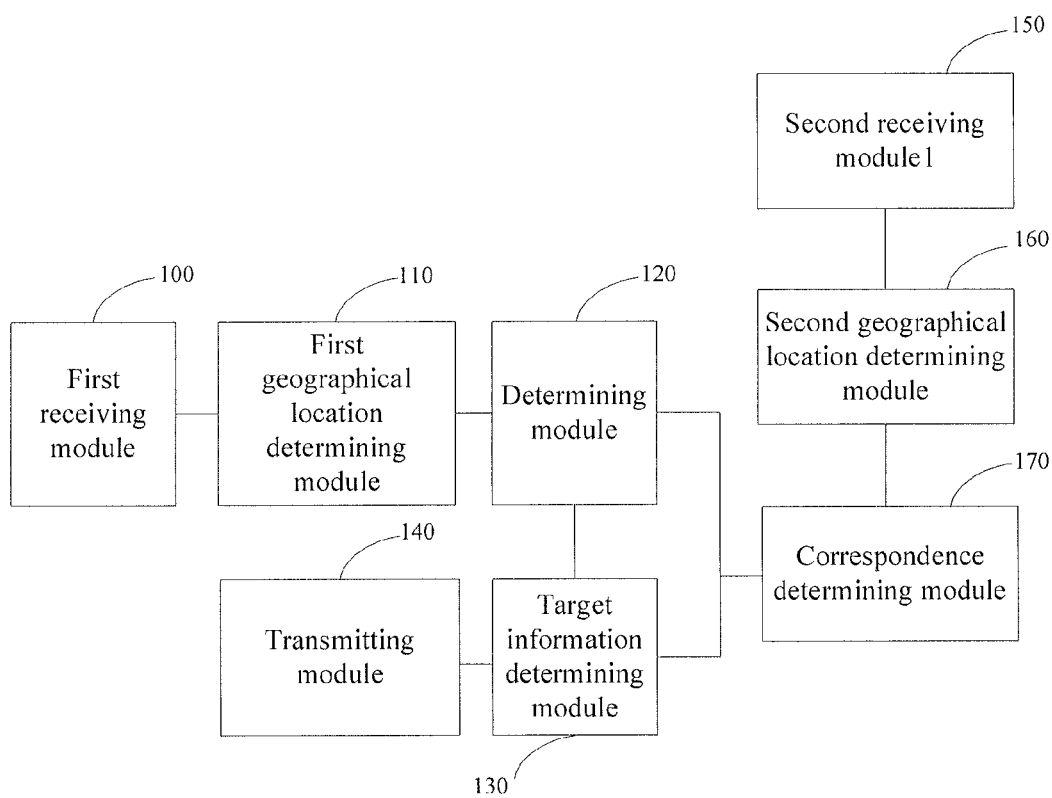
FIG. 17 is another structural block diagram of a device for sharing information according to an embodiment of the present disclosure.

The correspondence between the geographical sharing range and the information-for-sharing may be determined based on the information-for-sharing uploaded by the second terminal device and the second geographical location. Accordingly, another structural block diagram of a device for sharing information according to an embodiment of the present disclosure is shown in FIG. 17. Combining FIG. 16 and FIG. 17, the device for sharing information further includes: a second receiving module 150, a second geographical location determining module 160 and a correspondence determining module 170.

The second receiving module 150 is configured to receive a second message including the information-for-sharing, uploaded by the second terminal device.

The second geographical location determining module 160 is configured to determine a current location of the second terminal device as the second geographical location.

The correspondence determining module 170 is configured to determine the correspondence between the geographical sharing range and the information-for-sharing based on the information-for-sharing uploaded by the second terminal device and the second geographical location.

There may be at least three manners for the correspondence determining module 170 to determine the correspondence between the geographical sharing range and the information-for-sharing. For details, please refer to the first implementation, the second implementation and the third implementation described above.

Figure 18:
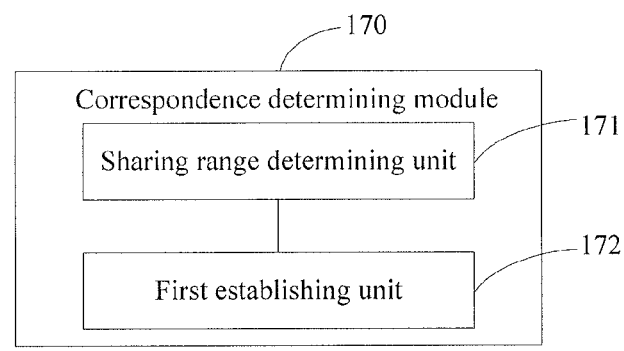
FIG. 18 is a structural block diagram of a correspondence determining module according to an embodiment of the present disclosure.

FIG. 18 shows a possible structure of the correspondence determining module 170 according to an embodiment of the present disclosure. The correspondence determining module 170 includes: a sharing range determining unit 171 and a first establishing unit 172.

The sharing range determining unit 171 is configured to determine the geographical sharing range corresponding to the information-for-sharing based on the second geographical location.

The first establishing unit 172 is configured to establish the correspondence between the geographical sharing range and the information-for-sharing.

Figure 19:
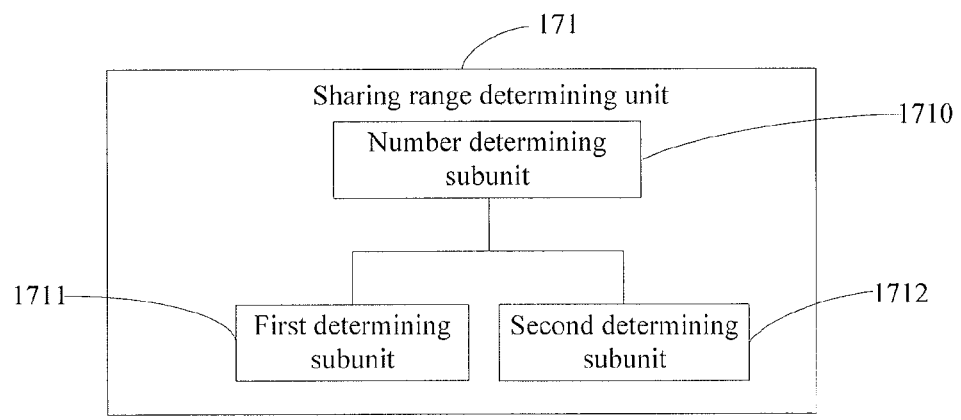
FIG. 19 is a structural block diagram of a sharing range determining unit according to an embodiment of the present disclosure.

FIG. 19 shows a possible structure of the sharing range determining unit 171. The sharing range determining unit 171 includes: a quantity determining subunit 1710, a first determining subunit 1711 and a second determining subunit 1712.

The quantity determining subunit 1710 is configured to determine a quantity of active users in a geographical range with a pre-determined size which contains the second geographical location.

The first determining subunit 1711 is configured to: if the quantity of the active users reaches a pre-determined value, determine the geographical range with the pre-determined size as the geographical sharing range.

The second determining subunit 1712 is configured to: if the quantity of the active users does not reach the pre-determined value, extend the pre-determined geographical range until the quantity of active users in the extended geographical range reaches the pre-determined value, and determine the extended geographical range in which the quantity of the active users reaches the pre-determined value as the geographical sharing range.

Figure 20:
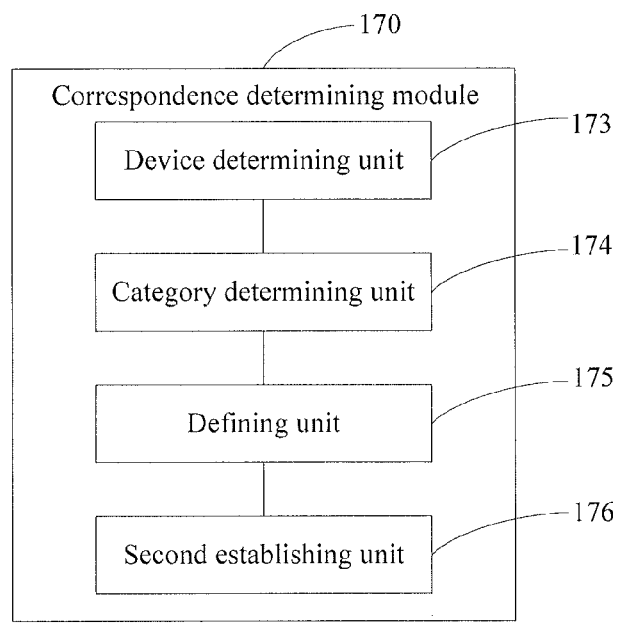
FIG. 20 is another structural block diagram of a correspondence determining module according to an embodiment of the present disclosure.

FIG. 20 shows another possible structure of the correspondence determining module 170. The correspondence determining module 170 includes: a device determining unit 173, a category determining unit 174, a defining unit 175 and a second establishing unit 176.

The device determining unit 173 is configured to determine a second terminal device located in a pre-determined geographical range based on current second geographical locations of respective second terminal devices.

The category determining unit 174 is configured to determine an information category corresponding to the information-for-sharing uploaded by the second terminal device in the pre-determined geographical range.

The defining unit 175 is configured to define first information corresponding to the information category. The first information is the information-for-sharing corresponding to the pre-determined geographical range.

The second establishing unit 176 is configured to establish a correspondence between the pre-determined geographical range and the first information.

Figure 21:
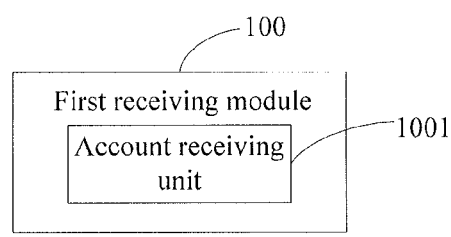
FIG. 21 is a structural block diagram of a first receiving module according to an embodiment of the present disclosure.

In a social application scenario, a structure of the first receiving module 100 according to an embodiment of the present disclosure is shown in FIG. 21. The first receiving module 100 includes: an account receiving unit 1001, configured to receive from the first terminal device the first message for requesting information-for-sharing. The first message includes: an application account used by the first terminal device to log in a first application.

Figure 22:
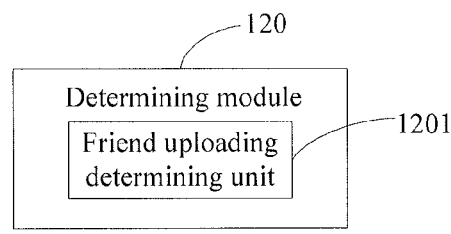
FIG. 22 is a structural block diagram of a determining module according to an embodiment of the present disclosure.

Accordingly, a structure of the determining module 120 is shown in FIG. 22. The determining module 120 includes a friend uploading determining unit 1201, configured to determine whether a geographical sharing range matched with the first geographical location exists, where the geographical sharing range includes the second geographical location where the second terminal device is located while uploading the information-for-sharing with a friend account of the application account. Both the friend account and the application account are user accounts of the first application.

Figure 23:
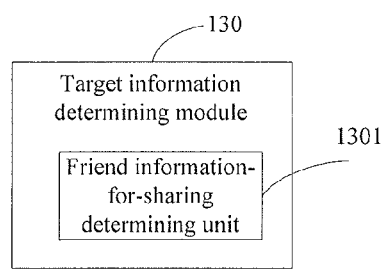
FIG. 23 is a structural block diagram of a target information determining module according to an embodiment of the present disclosure.

Accordingly, a structure of the target information determining module 130 is shown in FIG. 23. The target information determining module 130 includes a friend information-for-sharing determining unit 1301, configured to: in a case that it is determined that a geographical sharing range matched with the first geographical location exists, determine the target information-for-sharing uploaded by the second terminal device with the friend account, from the information-for-sharing corresponding to the geographical sharing range matched with the first geographical location.

Based on the first geographical location of the first terminal device, the device for sharing information can determine the target information-for-sharing from the correspondence between the geographical sharing range and the information-for-sharing uploaded in the geographical sharing range if it is determined that a geographical sharing range matched with the first geographical location exists. In this way, sharing of information-for-sharing related to a current location of a terminal device is realized. In a process of requesting the information-for-sharing related to the current location of the terminal device, a user may realize information sharing based on the current location of the terminal device and a correspondence, pre-stored by the server, between the geographical sharing range and the information-for-sharing without the need of determining a name of a current position while the user does not know the name of the current position. Therefore, the process of information sharing is simplified, and sharing of the information-for-sharing related to the current location of the terminal device is realized conveniently.

A server is further provided according to an embodiment of the present disclosure. The server may include a device for sharing information described above.

Figure 24:
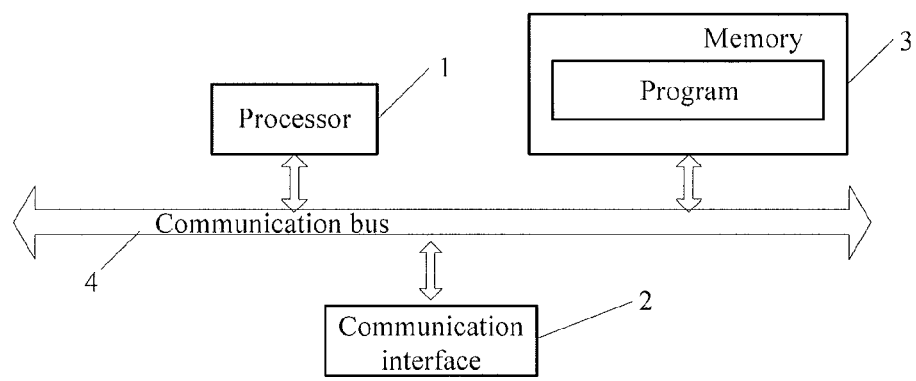
FIG. 24 is a block diagram of a hardware structure of a server according to an embodiment of the present disclosure.

FIG. 24 shows a block diagram of a hardware structure of a server. The server includes: one or more processors 1 (only one is shown in the figure), a communication interface 2, a memory 3 and a communication bus 4.

The processors 1, the communication interface 2 and the memory 3 communicate with each other via the communication bus 4.

The communication interface 2 may be an interface of a communication module, such as an interface of a GSM module.

The processors 1 are configured to execute a program.

The memory 3 is configured to store the program.

The program may include program codes including computer operating instructions.

The processor 1 may be a central processing unit CPU or an application specific integrated circuit ASIC, or are configured to be one or more integrated circuits.

The memory 3 may include a high speed RAM memory, and may further include a non-volatile memory such as at least one magnetic disk storage.

The program may be used to:

receive from a first terminal device a first message for requesting information-for-sharing;

determine a current first geographical location of the first terminal device;

determine whether a geographical sharing range matched with the first geographical location exists, where the geographical sharing range contains a second geographical location where a second terminal device is located while uploading information-for-sharing;

if it is determined that a geographical sharing range matched with the first geographical location exists, determine target information-for-sharing corresponding to the geographical sharing range matched with the first geographical location, based on a correspondence between the geographical sharing range and the information-for-sharing uploaded in the geographical sharing range; and transmit the target information-for-sharing to the first terminal device.

A device for sharing information according to an embodiment of the present disclosure, which is described from the perspective of a terminal device, is introduced hereinafter. For content described hereinafter which is related to a method for sharing information, reference may be made to the corresponding part described above.

Figure 25:
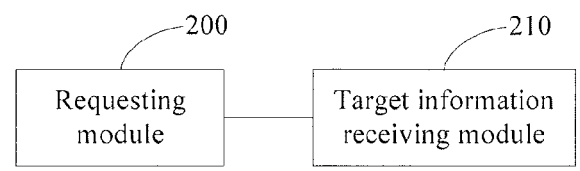
FIG. 25 is another structural block diagram of a device for sharing information according to an embodiment of the present disclosure.

FIG. 25 is yet another structural block diagram of a device for sharing information according to an embodiment of the present disclosure. The device for sharing information includes: a requesting module 200, a target information receiving module 210 and an uploading module 220.

The requesting module 200 is configured to transmit a first message for requesting information-for-sharing to a server.

The target information receiving module 210 is configured to: after the server determines a current location of a terminal device as a first geographical location and determines that a geographical sharing range matched with the first geographical location exists, receive, from the server, target information-for-sharing corresponding to the geographical sharing range matched with the first geographical location, where the target information-for-sharing is determined based on a correspondence between the geographical sharing range and information-for-sharing uploaded in the geographical sharing range. The geographical sharing range contains a second geographical location where a second terminal device is located while uploading the information-for-sharing.

Figure 26:
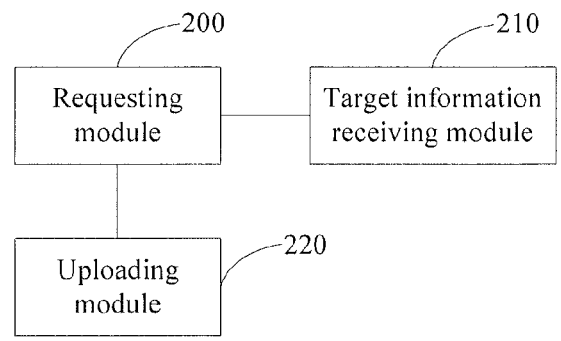
FIG. 26 is yet another structural block diagram of a device for sharing information according to an embodiment of the present disclosure.

The device for sharing information is described from the perspective of the terminal device that requests information-for-sharing (i.e., a first terminal device). The device that requests information-for-sharing may also serve as a terminal device that uploads the information-for-sharing (i.e., the second terminal device). Accordingly, yet another structural block diagram of a device for sharing information is shown in FIG. 26. Combining FIG. 25 and FIG. 26, the device for sharing information device further includes: an uploading module 220, configured to upload a second message including the information-for-sharing to the server.

Figure 27:
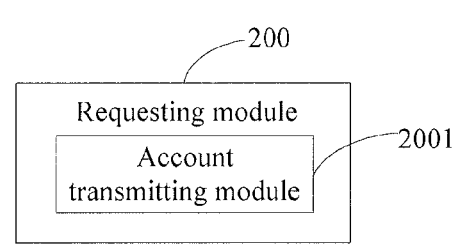
FIG. 27 is a structural block diagram of a requesting module according to an embodiment of the present disclosure.

In a social application scenario, a structure of the requesting module 200 may be that as shown in FIG. 27. The requesting module 200 includes: an account transmitting module 2001, configured to transmit the first message for requesting information-for-sharing to the server, where the first message includes an application account used by the first terminal to log in a first application.

Figure 28:
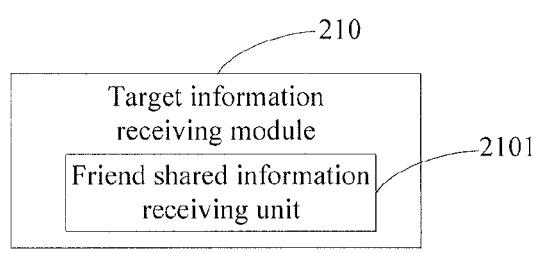
FIG. 28 is a structural block diagram of a target information receiving module according to an embodiment of the present disclosure.

Accordingly, a possible structure of the target information receiving module 210 according to an embodiment of the present disclosure is shown in FIG. 28. The target information receiving module 210 includes: a friend information-for-sharing receiving unit 2101, configured to: receive the determined target information-for-sharing transmitted by the server, after the server determines that a geographical sharing range matched with the first geographical location exists and determines the information-for-sharing uploaded by the second terminal device with a friend account of the application account from the information-for-sharing corresponding to the geographical sharing range matched with the first geographical location, where the geographical sharing range contains the second geographical location where the second terminal device uploads the information-for-sharing with the friend account, and both the friend account and the application account are user accounts of the first application.

A terminal device is further provided according to an embodiment of the present disclosure. The terminal device may include a device for sharing information described above.

The terminal device may be a wearable device, and the obtained target information-for-sharing may be displayed on a display unit of the wearable device. The wearable device may label objects in the real word at the first geographical location to generate a three-dimensional information space, add the obtained target information-for-sharing to the three-dimensional information space to display on the display unit.

Figure 29:
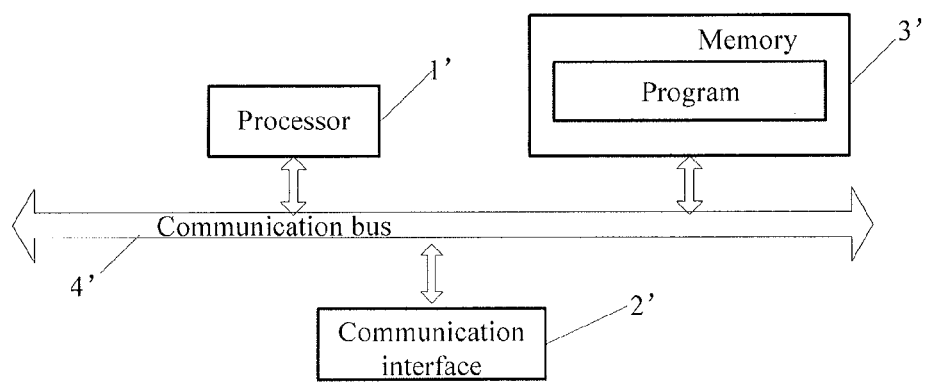
FIG. 29 is a block diagram of a hardware structure of a terminal device according to an embodiment of the present disclosure.

FIG. 29 shows a hardware structure of a terminal device, and reference can be made to it. As shown in FIG. 29, the terminal device may include: a processor 1', a communication interface 2', a memory 3' and a communication bus 4'.

The processor 1', the communication interface 2' and the memory 3' communicate with each other via the communication bus 4'.

Optionally, the communication interface 2' may be an interface of a communication module, such as an interface of a GSM module.

The processor 1' is configured to execute a program.
The memory 3' is configured to store the program.

The program may include program codes including computer operating instructions.

The processor 1' may be a central processing unit CPU or an application specific integrated circuit ASIC (Application Specific Integrated Circuit), or is configured to be one or more integrated circuits according to an embodiment of the present disclosure.

The memory 3' may include a high speed RAM memory, and may further include a non-volatile memory (non-volatile memory) such as at least one magnetic disk storage.

The program may be used to:
upload a first message for requesting information-for-sharing to a server; and
after the server determines a current first geographical location of a terminal device and determines that a geographical sharing range matched with the first geographical location exists, receive from the server, target information-for-sharing corresponding to the geographical sharing range matched with the first geographical location, where the target information-for-sharing is determined based on a correspondence between the geographical sharing range and information-for-sharing uploaded in the geographical sharing range. The geographical sharing range contains a second geographical location where a second terminal device is located while uploading the information-for-sharing.

A system for sharing information according to an embodiment of the present disclosure is introduced hereinafter. Content described hereinafter and the method for sharing information described above may refer to each other.

Figure 30:
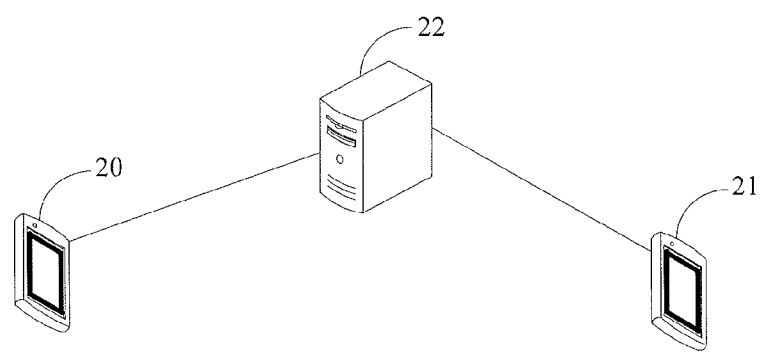
FIG. 30 is another structural block diagram of a system for sharing information according to an embodiment of the present disclosure.

FIG. 30 is another structural block diagram of a system for sharing information according to an embodiment of the present disclosure. The system for sharing information may include: a first terminal device 20, a second terminal device 21 and a server 22.

The second terminal device 21 is configured to upload a second message including information-for-sharing to a server.

The first terminal device 20 is configured to transmit a first message for requesting information-for-sharing to the server and receive target information-for-sharing transmitted by the server.

The server 22 is configured to: after receiving the second message, determine a current location of the second terminal device as a second geographical location, determine a correspondence between a geographical sharing range and the information-for-sharing uploaded in the geographical sharing range based on the information-for-sharing uploaded by the second terminal device and the second geographical location, and pre-store the correspondence between the geographical sharing range and the information-for-sharing uploaded in the geographical sharing range, where the geographical sharing range contains the second geographical location where the second terminal device is located while uploading the information-for-sharing; and after receiving the first message, determine a current location of the first terminal device as a first geographical location, determine whether a geographical sharing range matched with the first geographical location exists, determine the target information-for-sharing corresponding to the geographical sharing range matched with the first geographical location based on the correspondence between the geographical sharing range and the information-for-sharing uploaded in the geographical sharing range if it is determined that a geographical sharing range matched with the first geographical location exists, and transmit the target information-for-sharing to the first terminal device.

The first terminal device and the second terminal device may be the same terminal device.

Thus, the process of information sharing is simplified, and sharing of information-for-sharing related to a current location of a terminal device is realized conveniently.

Various embodiments in the specification are described in a progressive manner, the differences from other embodiments are illustrated in each embodiment, and reference can be made to other embodiments for understanding the same or similar parts of the embodiments. Since the device disclosed by the embodiments corresponds to the method disclosed by the embodiments, the device is described briefly and reference is made to the descriptions in the method for related parts.

Those skilled in the art may realize that, units and algorithms in the examples described in conjunction with the embodiments disclosed herein may be implemented by electronic hardware, computer software or a combination of the two. In order to clearly illustrate interchangeability of hardware and software, components and steps in the examples are generally described in the above descriptions based on functions. Whether the functions are implemented in a form of hardware or software depends on specific applications and restrictive conditions on design of the technical solutions. Those skilled in the art may implement the described functions with a different method for each specific application, and the implementation should not be interpreted as departing from the scope of the present disclosure.

The method or steps of algorithms described in conjunction with in the embodiments disclosed herein may be directly implemented by hardware, a software module executed by a processor or a combination of the two. The software module may be placed in a random access memory (RAM), a memory, a read-only memory (ROM), an electrically programmable ROM, an electrically erasable programmable ROM, a register, a hard disk, a removable disk, a CD-ROM or a storage medium in any other form well known in the art.

The above descriptions of the disclosed embodiments enable those skilled in the art to practice or use the present disclosure. Various changes to the embodiments are apparent to those skilled in the art, and general principles defined herein may be implemented in other embodiments without departing from the spirit or scope of the present disclosure. Hence, the present disclosure is not limited to the embodiments disclosed herein but is to conform to the widest scope consistent with the principles and novel features disclosed herein.

The invention claimed is:

1. A method for sharing information, wherein the method is executed in a server comprising a memory, one or more processors and program instructions that are stored in the memory and are to be executed by the one or more processors, the method comprises:
   receiving a first message for requesting information-for-sharing, wherein the first message is transmitted by a first terminal device and comprises a first application account used by the first terminal device to log in a first application;
   determining a current location of the first terminal device based on a location from which the first message is transmitted, and recording the current location as a first geographical location;
   selecting a geographical sharing range matched with the first geographical location from a plurality of pre-set geographical sharing ranges;
   determining information-for-sharing corresponding to the geographical sharing range matched with the first geographical location as target information-for-sharing, based on a correspondence between the geographical sharing range and information-for-sharing uploaded in the geographical sharing range;
   transmitting the target information-for-sharing to the first terminal device;
   determining a quantity of active users uploading information-for-sharing in a geographical range within a pre-determined time period; and
   determining the geographical range as the geographical sharing range in response to the quantity reaching a pre-determined value,
   wherein the geographical sharing range matched with the first geographical location comprises a second geographical location where a second terminal device is located while uploading the information-for-sharing with a second application account of the first application, and the second application account is set by the first terminal device as a friend account of the first application account in the first application.

2. The method for sharing information according to claim 1, wherein the correspondence between the geographical sharing range and the information-for-sharing uploaded in the geographical sharing range is determined by the following steps:
   receiving a second message comprising the information-for-sharing, uploaded by the second terminal device;
   determining a location where the second terminal device is located while uploading the second message as the second geographical location;
   determining the geographical sharing range of the information-for-sharing based on the second geographical location; and
   establishing the correspondence between the geographical sharing range and the information-for-sharing at the second geographical location.

3. The method for sharing information according to claim 2, further comprising:
   if the quantity of active users does not reach the pre-determined value, extending the geographical range until the quantity of active users in the extended geographical range reaches the pre-determined value, and determining the extended geographical range in which the quantity of active users reaches the pre-determined value as the geographical sharing range.

4. The method for sharing information according to claim 1, wherein the correspondence between the geographical sharing range and the information-for-sharing uploaded in the geographical sharing range is determined by the following steps:
   determining the second terminal device located in a pre-determined geographical range based on second geographical locations where respective historical second terminal devices are located while uploading information-for-sharing;
   determining an information category corresponding to the information-for-sharing in second messages uploaded by the respective historical second terminal devices in the pre-determined geographical range;
   defining first information corresponding to the information category, wherein the first information is the information-for-sharing corresponding to the pre-determined geographical range; and
   establishing a correspondence between the pre-determined geographical range and the first information.

5. The method for sharing information according to claim 1, wherein the step of determining target information-for-sharing corresponding to the geographical sharing range matched with the first geographical location, based on a correspondence between the geographical sharing range and information-for-sharing uploaded in the geographical sharing range comprises:
  determining the target information-for-sharing uploaded by the second terminal device with the friend account, from the information-for-sharing corresponding to the geographical sharing range matched with the first geographical location.

6. The method for sharing information according to claim 1, wherein the first message comprises electing information; and the determining information-for-sharing corresponding to the geographical sharing range matched with the first geographical location as target information-for-sharing, based on a correspondence between the geographical sharing range and information-for-sharing uploaded in the geographical sharing range comprises:
  determining information-for-sharing matching the electing information from the information-for-sharing corresponding to the geographical sharing range matched with the first geographical location as the target information-for-sharing, based on the correspondence between the geographical sharing range and information-for-sharing uploaded in the geographical sharing range.

7. The method for sharing information according to claim 1, wherein the determining a current location of the first terminal device as a first geographical location comprises: determining the current location of the first terminal device as the first geographical location based on first geographical location information carried in the first message, wherein the first geographical location information represents the current location of the first terminal device.

8. The method for sharing information according to claim 1, wherein the determining a current location of the first terminal device as a first geographical location comprises: requesting from a base station for the current location of the first terminal device, determining the current location as the first geographical location, and receiving, from the base station, information comprising the current location of the first terminal device determined by base station positioning.

9. A device for sharing information, operating in a server, the server comprising:
  a memory;
  one or more processors; and
  one or more program modules stored in the memory and to be executed by the one or more processors, wherein the one or more program modules comprise:
  a first receiving module, configured to receive a first message for requesting information-for-sharing, wherein the first message is transmitted by a first terminal device and the first message comprises a first application account used by the first terminal device to log in a first application;
  a first geographical location determining module, configured to determine a current location of the first terminal device based on a location from which the first message is transmitted, and record the current location as a first geographical location;
  a determining module, configured to select a geographical sharing range matched with the first geographical location from a plurality of pre-set geographical sharing ranges;
  a target information determining module, configured to determine information-for-sharing corresponding to the geographical sharing range matched with the first geographical location as target information-for-sharing, based on a correspondence between the geographical sharing range and information-for-sharing uploaded in the geographical sharing range, if it is determined that a geographical sharing range matched with the first geographical location exists;
  a transmitting module, configured to transmit the target information-for-sharing to the first terminal device; and
  a sharing range determining unit, comprising:
    a quantity determining subunit, configured to determine a quantity of active users uploading information-for-sharing in a geographical range within a pre-determined time period; and
    a first determining subunit, configured to determine the geographical range as the geographical sharing range in response to the quantity reaching a pre-determined value,
  wherein the geographical sharing range matched with the first geographical location comprises a second geographical location where a second terminal device is located while uploading the information-for-sharing with a second application account of the first application, and the second application account is set by the first terminal device as a fried account of the first application account in the first application.

10. The device for sharing information according to claim 9, further comprising a second receiving module, a second geographical location determining module and a first establishing unit, wherein:
  the second receiving module is configured to receive a second message comprising the information-for-sharing, uploaded by the second terminal device;
  the second geographical location determining module is configured to determine a current location of the second terminal device as the second geographical location;
  the sharing range determining unit is configured to determine the geographical sharing range of the information-for-sharing based on the second geographical location; and
  the first establishing unit is configured to establish the correspondence between the geographical sharing range and the information-for-sharing at the second geographical location.

11. The device for sharing information according to claim 10, wherein the sharing range determining unit further comprises:
  a second determining subunit, configured to: if the quantity of active users does not reach the pre-determined value, extend the pre-determined geographical range until the quantity of active users in the extended geographical range reaches the pre-determined value, and determine the extended geographical range in which the quantity of active users reaches the pre-determined value as the geographical sharing range.

12. The device for sharing information according to claim 9, further comprising:
  a second receiving module, configured to receive a second message comprising the information-for-sharing, uploaded by the second terminal device;
  a second geographical location determining module, configured to determine a current location of the second terminal device as the second geographical location;
  a device determining unit, configured to determine the second terminal device located in a pre-determined geographical range based on second geographical locations where respective historical second terminal devices are located while uploading information-for-sharing;

a category determining unit, configured to determine an information category corresponding to the information-for-sharing in the second messages uploaded by the respective historical second terminal devices in the pre-determined geographical range a defining unit, configured to define first information corresponding to the information category, wherein the first information is the information-for-sharing corresponding to the pre-determined geographical range; and a second establishing unit, configured to establish a correspondence between the pre-determined geographical range and the first information.

13. The device for sharing information according to claim 9, wherein the target information determining module comprises: a friend information-for-sharing determining unit, configured to: in a case that it is determined that a geographical sharing range matched with the first geographical location exists, determine the target information-for-sharing uploaded by the second terminal device with the friend account, from the information-for-sharing corresponding to the geographical sharing range matched with the first geographical location.

14. A non-transitory, tangible non-volatile storage medium for storing program instructions, wherein the program instructions, when being executed by a processor, configure the processor to:

receive a first message for requesting information-for-sharing, wherein the first message is transmitted by a first terminal device and the first message comprises a first application account used by the first terminal device to log in a first application;

determine a current location of the first terminal device based on a location from which the first message is transmitted, and record the current location as a first geographical location;

determine that a geographical sharing range matched with the first geographical location exists in pre-set geographical sharing ranges;

determining information-for-sharing corresponding to the geographical sharing range matched with the first geographic location as target information-for-sharing, based on a correspondence between the geographical sharing range and information-for-sharing uploaded in the geographical sharing range; and transmit the target information-for-sharing to the first terminal device, determine a quantity of active users uploading information-for-sharing in a geographical range within a pre-determined time period; and determine the geographical range as the geographical sharing range in response to the quantity reaching a pre-determined value, wherein the geographical sharing range matched with the first geographical location comprises a second geographical location where a second terminal device is located while uploading the information-for-sharing with a second application account of the first application, and the second application account is set by the first terminal device as a fried account of the first application account in the first application.

* * * * *